US005608214A

United States Patent [19]
Baron et al.

[11] Patent Number: 5,608,214
[45] Date of Patent: Mar. 4, 1997

[54] GAMMA RAY SPECTRAL TOOL FOR WELL LOGGING

[75] Inventors: Emilio A. Baron, Missouri City; David J. Berneking; John W. Chisholm, both of Houston; Marc K. Fisher, Katy; William F. Trainor, Houston; James R. Foreman, Sugarland, all of Tex.

[73] Assignee: Protechnics International, Inc., Houston, Tex.

[21] Appl. No.: 550,287

[22] Filed: Oct. 30, 1995

[51] Int. Cl.$^6$ ............................................. G01V 5/12
[52] U.S. Cl. ............................... 250/262; 250/269.3
[58] Field of Search ............................... 250/262, 269.1, 250/269.3

[56] References Cited

U.S. PATENT DOCUMENTS

| | | | |
|---|---|---|---|
| 4,421,982 | 12/1983 | Potter et al. | 250/260 |
| 4,471,435 | 9/1984 | Meisner | 364/422 |
| 4,524,273 | 6/1985 | Hubner | 250/269.3 |
| 4,585,939 | 4/1986 | Arnold et al. | 250/256 |
| 4,628,202 | 12/1986 | Minette | 250/269.3 |
| 4,639,596 | 1/1987 | Tanner, III et al. | 250/259 |
| 4,731,531 | 3/1988 | Handke | 250/259 |
| 4,743,761 | 5/1988 | Raheim et al. | 250/259 |
| 4,825,072 | 4/1989 | McWhirter et al. | 250/259 |
| 4,857,234 | 8/1989 | Gant et al. | 252/645 |
| 4,857,729 | 8/1989 | Gadeken et al. | 250/260 |
| 4,861,986 | 8/1989 | Arnold | 250/260 |
| 4,864,128 | 9/1989 | Priest | 250/260 |
| 4,883,956 | 11/1989 | Meicher et al. | 250/269 |
| 4,916,312 | 4/1990 | Ellis et al. | 250/260 |
| 4,966,233 | 10/1990 | Blount et al. | 166/250 |
| 4,984,634 | 1/1991 | Pilla | 166/250 |
| 5,001,342 | 3/1991 | Rambow | 250/260 |
| 5,027,379 | 6/1991 | Hunt et al. | 378/4 |
| 5,038,033 | 8/1991 | Carroll et al. | 250/256 |
| 5,047,635 | 9/1991 | Leaney et al. | 250/256 |
| 5,049,743 | 9/1991 | Taylor, III et al. | 250/303 |
| 5,081,351 | 1/1992 | Roscoe et al. | 250/270 |
| 5,105,080 | 4/1992 | Stoller et al. | 250/270 |
| 5,121,872 | 6/1992 | Legget | 228/148 |
| 5,164,591 | 11/1992 | Fleming et al. | 250/260 |
| 5,278,758 | 1/1994 | Perry et al. | 364/422 |
| 5,369,578 | 11/1994 | Roscoe et al. | 364/422 |
| 5,404,010 | 4/1995 | Anderson et al. | 250/260 |
| 5,410,152 | 4/1995 | Gadeken | 250/260 |
| 5,412,206 | 5/1995 | Seidel et al. | 250/253 |

OTHER PUBLICATIONS

Gadeken, L. L., and Smith, H. D., Jr., *A Relative Distance Indicator from Gamma Ray Spectroscopy Measurements with Radioactive Tracers*, Halliburton Logging Services, Inc., 1989 Society of Petroleum Engineers, SPE 17962.

Gadeken, L. L., and Smith, H. D., Jr., *Tracerscan—A Spectroscopy Technique for Determining the Distribution of Multiple Radioactive Tracers in Downhole Operations* (Abstract), Presented at the 27th Annual SPWLA Symposium in Houston, Texas (Jun. 1986).

Gadeken, L. L., Smith, H. D., Jr., and Seifert, D. J., *Calibration and Analysis of Borehole and Formation Sensitivities for Gamma Ray Spectroscopy Measurements with Multiple Radioactive Tracers* (Technical Paper), Presented at the 28th Annual SPWLA Symposium in London, England (Jun. 1987).

(List continued on next page.)

Primary Examiner—David P. Porta
Assistant Examiner—David Vernon Bruce
Attorney, Agent, or Firm—Pravel, Hewitt, Kimball & Krieger

[57] ABSTRACT

A gamma ray spectral tool is provided that can be used in slick line systems. The tool includes a battery, a controller, and a memory. In operation, the tool compresses data from the spectral detector for storage in the memory, allowing for long runs without the memory overflowing. Further, a controller latches the self-adjusting stabilization feature of the spectral detector when gamma ray intensity exceeds a predetermined threshold, preventing erroneous "stabilization" by the stabilization feature of the spectral detector.

15 Claims, 10 Drawing Sheets

OTHER PUBLICATIONS

Gadeken, L. L., Gartner, M. L., Sharbak, D. E., and Wyatt, D. F., *The Interpretation of Radioactive–Tracer Logs Using Gamma–Ray Spectroscopy Measurements*, Presented at the 12th International Formation Evaluation Symposium, paper KK, Paris, 24–27 Oct. 1989.

Tracerscan™, 1995 Halliburton Energy Services.

Taylor, J. L., III and Bandy, T. R., Tracer Technology Finds Expanding Applications, *Tracers in the Petroleum Industry*, Petroleum Engineer International (Jun. 1989), pp. 31–36.

Taylor, J. Lawrence, III, and Chisholm, John W., *Tracers Can Improve Hydraulic Fracturing*, Petroleum Engineer International (Jul. 1989).

TracerScan Service, 1990 Halliburton Logging Services, Inc. (1990).

Lysne, Peter *Downhole Memory–Logging Tools*, Plan for Cooperation, pp. 89–91 (1992).

Normann, R. A. Henfling, J. A., and Blackwell, D. D., *Development of Field Use of a Memory–Based Pressure/ Temperature Logging Tool for the Geothermal Industry* no date.

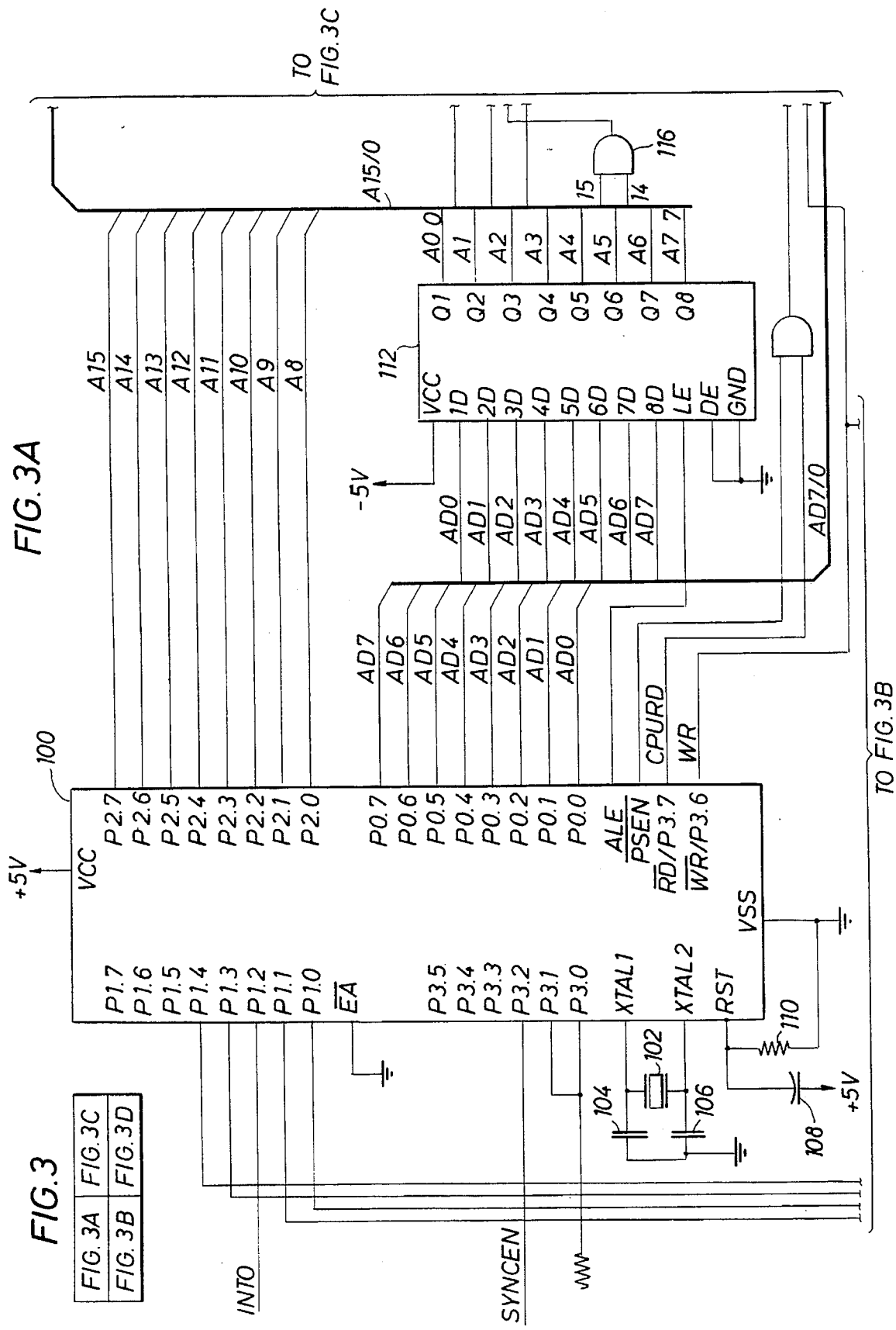

FIG. 5A
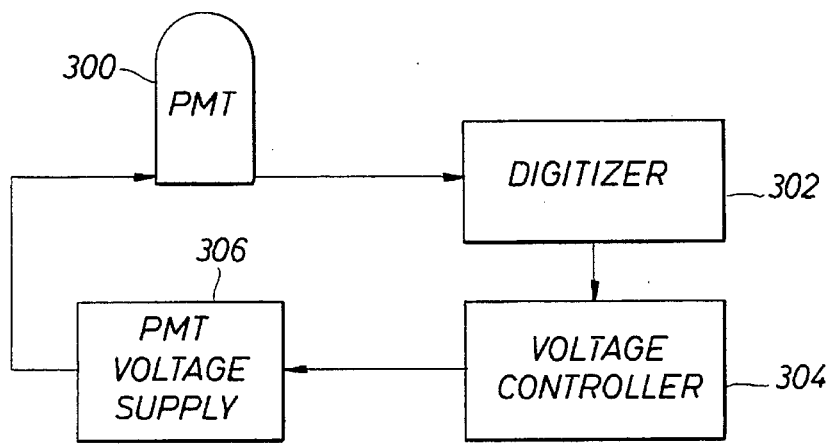
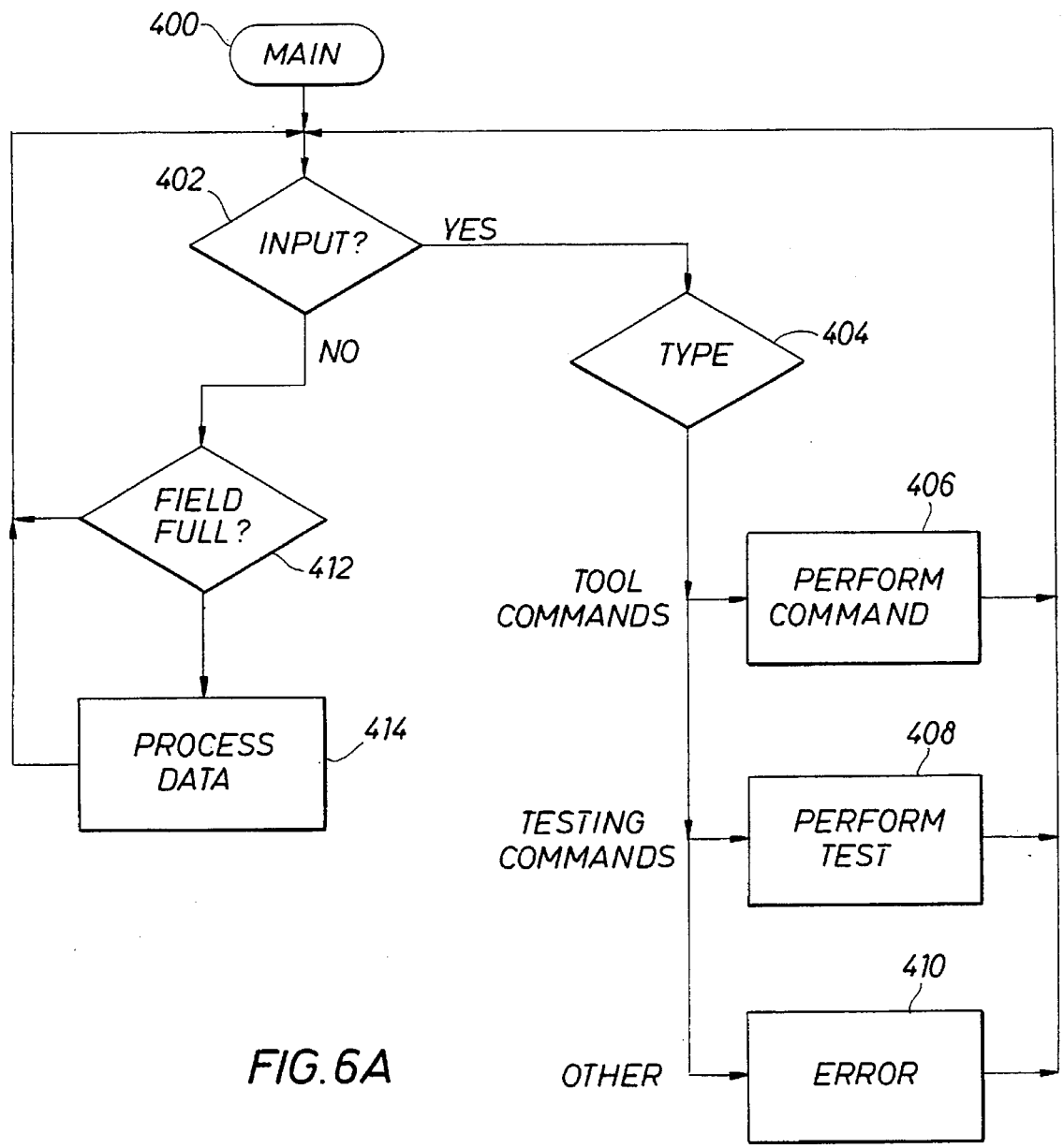
FIG. 6A

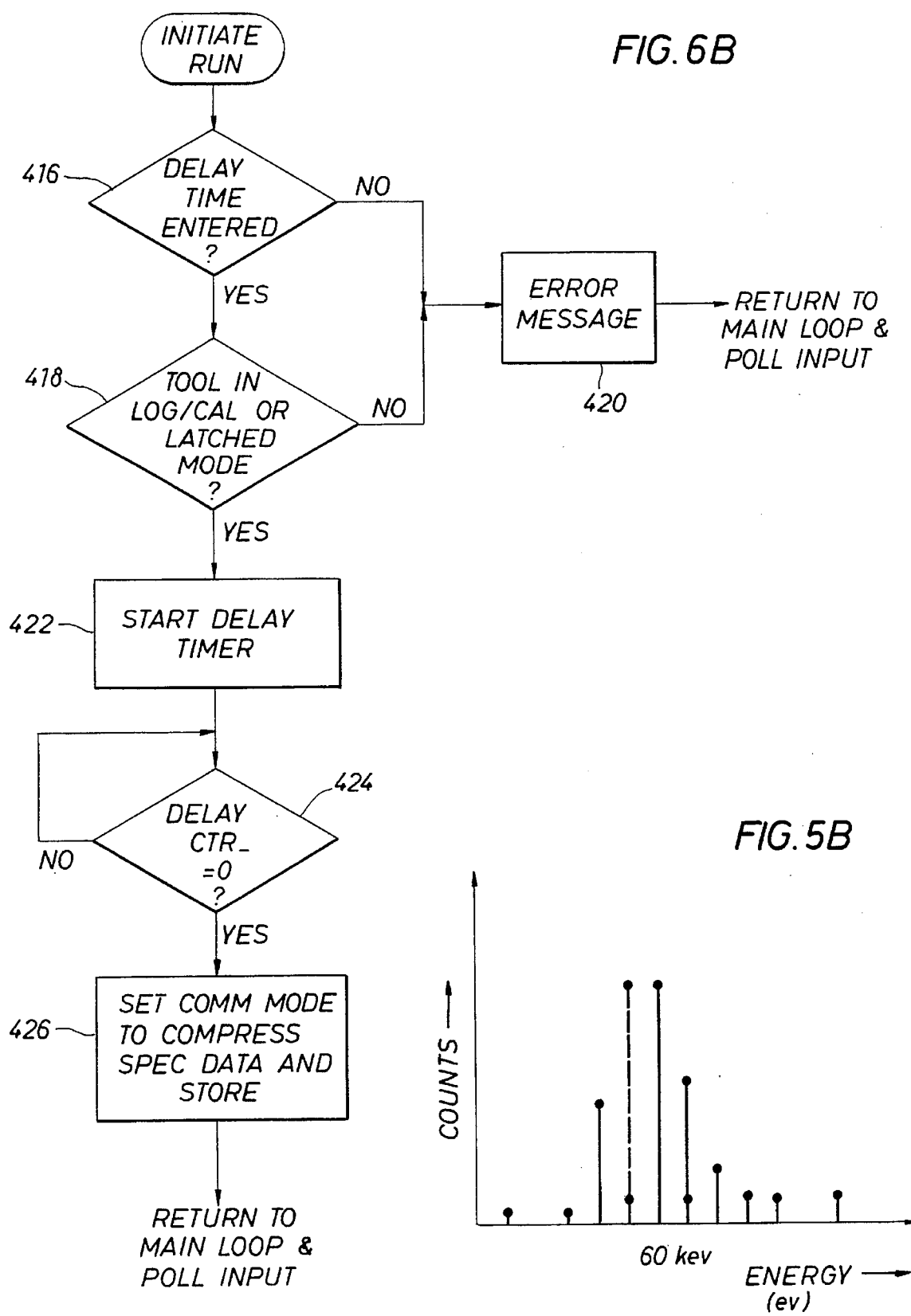

GAMMA RAY SPECTRAL TOOL FOR WELL LOGGING

BACKGROUND OF THE INVENTION

1. Field of the Invention

The invention relates to well logging tools, and more specifically to a gamma ray spectral memory tool.

2. Description of the Related Art

A vast array of tools are used for well logging. These tools, which can measure pressure, temperature, and a wide variety of other parameters, are typically lowered into the well at various points in drilling and production operations to determine conditions down hole and to determine the effect of various drilling procedures.

These well logging tools generally process the data they accumulate in two different ways. In the first technique, the tools are lowered on what is known as a wireline, an electric line that allows bidirectional data communication with the surface and allows power to be provided from the surface. In the second technique, the tool is instead lowered on a slick line or non-electrical cable and the tool must provide its own power and data storage.

Wireline systems allow dynamic monitoring of the well logging tools and eliminate the need for large memories within the tool. Wireline, however, is much more expensive than slick line.

A slick line is typically used in conjunction with a tool that has on-board memory of some sort and need not communicate with the surface. A battery powered tool is lowered into the well, the tool records the data, and that data is downloaded when the tool is brought to the surface. Although less expensive to use, slick line tools must be capable of operation independent from surface control.

One parameter that well logging tools measure is the presence of gamma rays. Radioactive materials can be injected into the well and then the location of those materials tracked by the gamma ray output of the radioactive materials. Different radioactive materials output gamma rays having different energies. A well logging tool can monitor either overall gamma ray count per unit time, or a gamma ray spectral tool can further determine not only the gamma ray count, but also the energies of those gamma rays. The former technique, which simply detects gamma rays, has been used in conjunction with both wireline and slick line systems.

Spectral gamma ray tools, however, have historically been used only in wireline systems. Examples of such systems are found in U.S. Pat. No. 4,585,939 to Arnold et al. titled "Multi-Function Natural Gamma Ray Logging System" issued Apr. 29, 1986; U.S. Pat. No. 4,857,729 to Gadeken et al. titled "Method of Radioactive Well Logging" issued Aug. 15, 1989; and U.S. Pat. No. 5,410,152 to Gadeken titled "Low-Noise Method for Performing Downhole Well Logging Using Gamma Ray Spectroscopy to Measure Radioactive Tracer Penetration" issued Apr. 25, 1995, all three of which are incorporated by reference. Because spectral gamma ray tools divide the gamma ray counts based on their energy spectrum, they provide the capability to distinguish between different radioactive substances in or near a well and to determine where each is located. Such radioactive substances are used to trace the location of liquids or solids injected into a well. Solid particles used as tracers are described, for example, in U.S. Pat. No. 5,182,051.

These systems typically use an americium source as a gamma ray energy reference. Americium generates gamma rays of 60 Kev, so the spectral gamma ray tool can use this reference to determine the energy level of other gamma rays in proportion to that source. Gamma ray emissions from the americium source, as well as from other substances, strike a photomultiplier tube (PMT) in the spectral tool, which in turn outputs voltage pulses that are proportional to the energy of the gamma ray that caused the pulse. Electronics within the spectral gamma ray detector convert this pulse to a digital value and then increment a register corresponding to the energy denoted by that digital value, indicating another pulse has occurred within that portion of the energy spectrum. This is repeated over a period of time, for example 1.6 seconds and then this spectral data is then transmitted over the wireline. Typical instruments divide the gamma ray spectrum into approximately 250 energy channels, although the Halliburton TracerScan tool uses 512 energy channels, with approximately 8 bits of count data per channel. After the accumulated data is transmitted, all the registers are zeroed, and then the counting process repeats.

These gamma ray spectral tools provide a great deal of information, but historically these devices have been restricted to use in wireline systems. First, the photomultiplier tube requires a very high voltage source for its grids (around 1500 V), and has historically consumed too much power for extended runs on a slick line. Runs can take as long as eight hours, and it was simply impossible to provide battery power for that length of time.

Second, the volume of data generated by these spectral tools is greater than non-spectral gamma ray tools by over two orders of magnitude. Typically, a gamma ray spectral tool is run through a well zone of interest five times at a logging speed of 10 feet per minute, taking up to 8 hours. Assuming around 640 bytes of data is being generated over a 1.6 second period by the tool (1 byte per energy spectrum per second), in 8 hours an extraordinarily large amount of data is generated—over 11 megabytes. These storage requirements have been excessive because memory chips require power as well as space.

Further, spectral tools sometimes encounter areas of a high gamma ray concentration. In such a case, the reference signal from the americium can be masked by those high gamma ray levels. A stabilizer circuit in the tool typically monitors the digitized PMT output in an attempt to locate the 60 Kev gamma ray spike generated by the americium, which would generally be the strongest gamma ray source found. When this spike drifts off of the register designated for 60 Kev gamma rays, the supply voltage to the PMT is adjusted, forcing the americium spike back into the proper energy channel. (Again, the energy of gamma rays from the americium are constant and known.) In this way, the americium spike provides a reference to compensate for any drift in the PMT output. But when excessive gamma ray radiation is present, this americium spike can be masked, causing this automatic stabilization to fail, leading to uncontrollable misadjustments of the voltage level to the PMT. Gamma ray spectral tools have historically required dynamic monitoring from the surface for these "washout" conditions because otherwise the spectral tool could lose track of the reference signal, possibly causing faulty energy readings of the gamma rays actually being monitored.

For all of these reasons, spectral gamma ray instrumentation has historically been run in wireline systems, rather than slick line systems. This has resulted in increased costs because of the added expense of running wireline as opposed to slick line, which is simple to transport and simple to use.

Therefore, it would be greatly desirable to develop techniques to allow gamma ray spectral tools to be used in slick line systems.

SUMMARY OF THE INVENTION

In a well logging instrument according to the invention, a gamma ray spectral detector tool is run on a slick line rather than a wireline. The gamma ray tool includes a battery, a controller, and a memory. The controller receives digital spectral data from the gamma ray spectral detector, compresses that data, and stores that data in the memory. When the well logging tool is retrieved to the surface, that data is then downloaded to an analysis system.

Further according to the invention, the gamma ray spectral detector includes a log/calibration mode and a latched mode. In the log/calibration mode, a voltage to a photomultiplier tube is dynamically adjusted to compensate for output shifts of the photomultiplier tube as indicated by 60 Kev gamma rays from an americium source. In the latched mode, the voltage to the photomultiplier tube is held constant. According to the invention, when the digital output of the spectral detector indicates an overall quantity of gamma rays exceeding a predetermined value, the spectral detector is switched from the log/calibration mode to the latched mode.

BRIEF DESCRIPTION OF THE DRAWINGS

A better understanding of the present invention can be obtained when the following detailed description of the preferred embodiment is considered in conjunction with the following drawings, in which:

FIG. 5A is a block diagram illustrating the control of a voltage source to a photomultiplier tube in a spectral detector;

FIGS. 5B and 5C are spectral energy graphs indicating the effect of high gamma ray concentration upon the self-stabilizing aspect of a spectral detector; and FIG. 6A-6D are flowcharts illustrations of code for execution in an apparatus according to the invention.

DETAILED DESCRIPTION OF THE PREFERRED EMBODIMENT

Figure 1:
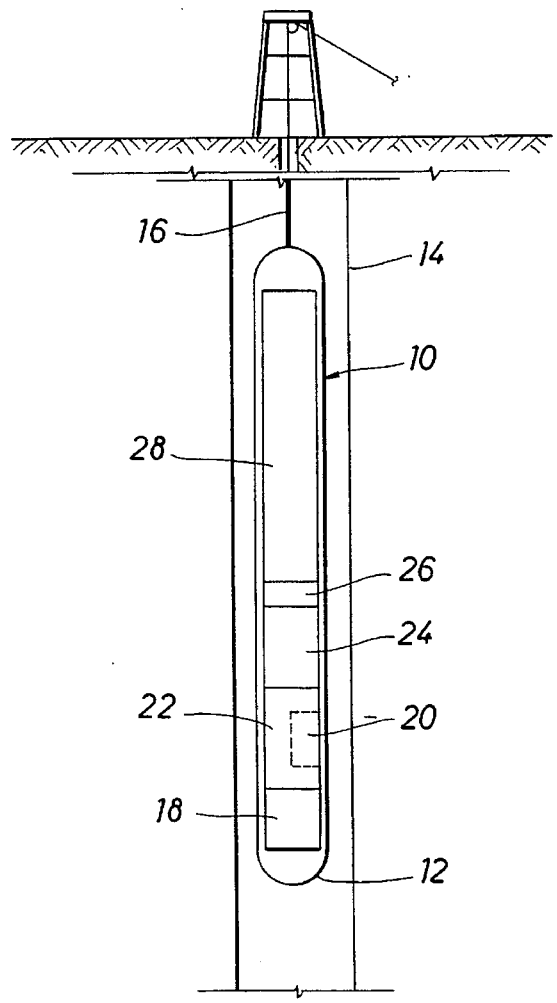
FIG. 1 is a block diagram illustrating the components of the gamma ray spectral tool in the well according to the invention.

Turning to FIG. 1, shown is a basic diagram of a down hole gamma ray spectral instrument 10 according to the invention. Typically, the entire instrument 10 is placed in a 17 foot long case 12, which is lowered into a well 14 on a slick line 16. The instrument 10 includes a gamma ray spectral detector 18, a memory 20, a controller 22, a collar locator (CCL) 24, an RS-232 interface 26, and batteries 28.

The gamma ray spectral detector 18 is one of many gamma ray spectroscopic instruments widely available. Manufacturers include Haliburton Logging Services, Houston, Tex.; Atlanta Scientific; and Schlumberger Technology Corporation, Houston, Tex. This device is preferably a TracerScan™ instrument developed by Haliburton. These devices generally use a sodium iodide crystal to capture gamma rays and emit pulses of light in response to those gamma rays. These pulses of light have an intensity proportional to the energy level of the gamma ray (measured in electron volts). The resulting light pulse then strikes a photomultiplier tube, which in turn emits a voltage pulse that is proportional to the energy level of the original gamma ray. This voltage pulse is also dependent on the photomultiplier tube's supply voltage. Further, a photomultiplier tube's gain tends to drift over time because of environmental factors. To compensate for this drift, these instruments typically use an americium source, which is a source of 60 Kev gamma rays, to adjust the voltage to the photomultiplier tube. If the peak in the photomultiplier tube output voltage that corresponds to the gamma rays from the americium source drifts, the supply voltage to the photomultiplier tube is correspondingly adjusted. This is further discussed below in conjunction with FIG. 5A.

These instruments also have various modes, such as a startup mode, a stabilization mode, a logging/calibration mode, and a latched mode. When in the logging/calibration mode, the peak from the americium source is automatically tracked, with the supply voltage to the photomultiplier being adjusted to compensate for drifts. When in the latched mode, the supply voltage to the photomultiplier tube is instead locked, preventing stabilization for drift.

The digitized output of the gamma ray spectral detector 18 is provided to the controller 22. This controller 22 is further discussed below in conjunction with FIG. 3. To summarize, it includes an embedded processor, a read only memory, a random access memory, and interface circuitry to allow it to receive the spectral digital data from the gamma ray spectral detector 18, compress that data, and store the compressed data in the memory 20. When the instrument 10 is retrieved to the surface, that data is then downloaded to an analysis system via the RS-232 port 26.

The batteries 28 provide power through a power supply to various components of the instrument 10. The batteries 28 must be sufficiently powerful to last around 8 hours. For that reason, preferably special batteries are used. These are 9 volt lithium or alkaline battery sticks, preferably manufactured by Southwest Electronics and built to specifications. The lithium batteries are used in high temperature applications, preferably capable of operating at temperatures up to 150 degrees centigrade. The alkaline batteries are used in low temperature applications, preferably capable of operating at up to 80 degrees centigrade. The batteries should be able to source 1.4 amps for 8 hours, and they should be diode protected and overload protected. For added capacity, they may be nearly 3½ feet long. The batteries 28 provide power to all of the components within the instrument 10.

Figure 2:
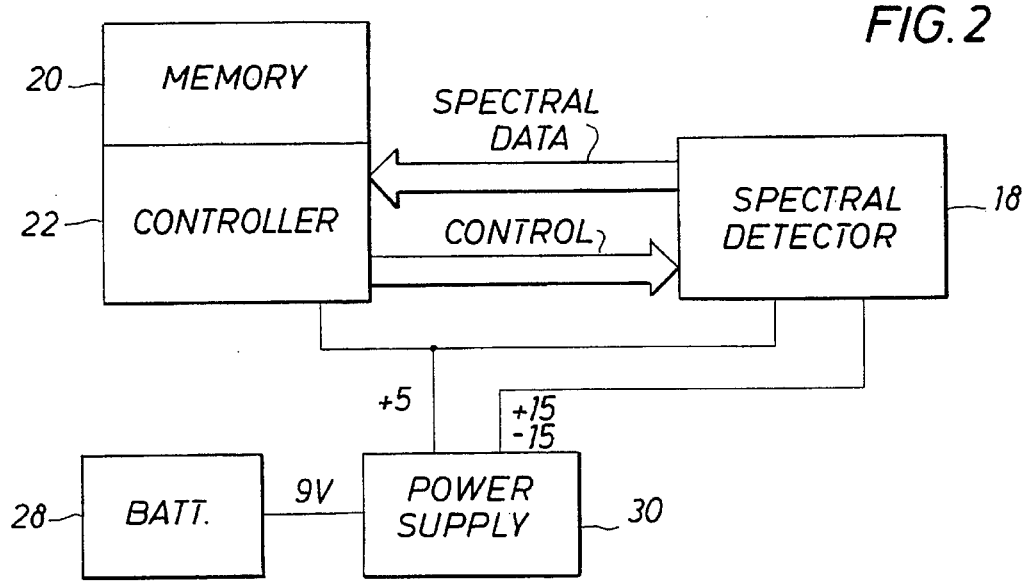
FIG. 2 is a block diagram illustrating the functional interconnection of the various components of the gamma ray spectral tool according to the invention.

Turning to FIG. 2, a block diagram is shown illustrating the logical interconnection of the various components of the instrument 10. The battery 28 provides a 9 volt supply voltage to a power supply 30. The power supply 30 in turn provides +5 volts to the controller 22 and the memory 20, and provides +5 and ±15 volt to the gamma ray spectral detector 18.

The controller 22 also provides control signals to the spectral detector 18, and the spectral detector 18 similarly provides spectral data to the controller 22. The precise format of the spectral data from the spectral detector 18 varies from instrument to instrument, but in essence is a digital representation of the gamma ray pulse count detected per energy spectra. A typical spectral detector 18 will include 512 discrete energy channels, 256 being in a low energy range, and 256 being in a high energy range. Within each channel, an 8-bit register will represent the gamma ray pulse count within that energy spectra since the spectral detector 18 started counting. Typically, the spectral detector 18 will reset around every 1.6 seconds, restarting its counting, and then transmitting its spectral data to the controller 22. This reset time may vary, however, depending on the spectral detector's manufacturer.

As will be appreciated, 640 channels (512 of spectral data and 128 in operational data) at 8 bits per channel constitutes around 640 bytes of data every 1.6 seconds. This is a high data rate, corresponding to nearly 11.5 megabytes of data over an 8 hour period.

Depending on the spectral detector 18 used, the data rate, the number of channels, and the exact format of the data may vary. The volume of data, however, is universally large.

The controller 22 also provides control data to the spectral detector 18. A variety of signals are generally provided, but for this discussion, the most important are the controls of the log/calibration circuitry for the photomultiplier tube supply voltage. As previously discussed, the supply voltage to the photomultiplier tube affects the digitized output voltage of the photomultiplier tube as it relates to the energy of a specific gamma ray. To maintain the photomultiplier tube in calibration, that supply voltage is adjusted to keep the 60 Kev americium gamma ray peak located within its corresponding spectral energy range in the spectral data provided to the controller 22. One of the controls from the controller 22 to the spectral detector 18 allows the controller 22 to disable the automatic calibration of the spectral detector 18, latching the supply voltage to its current voltage.

Figure 3B:
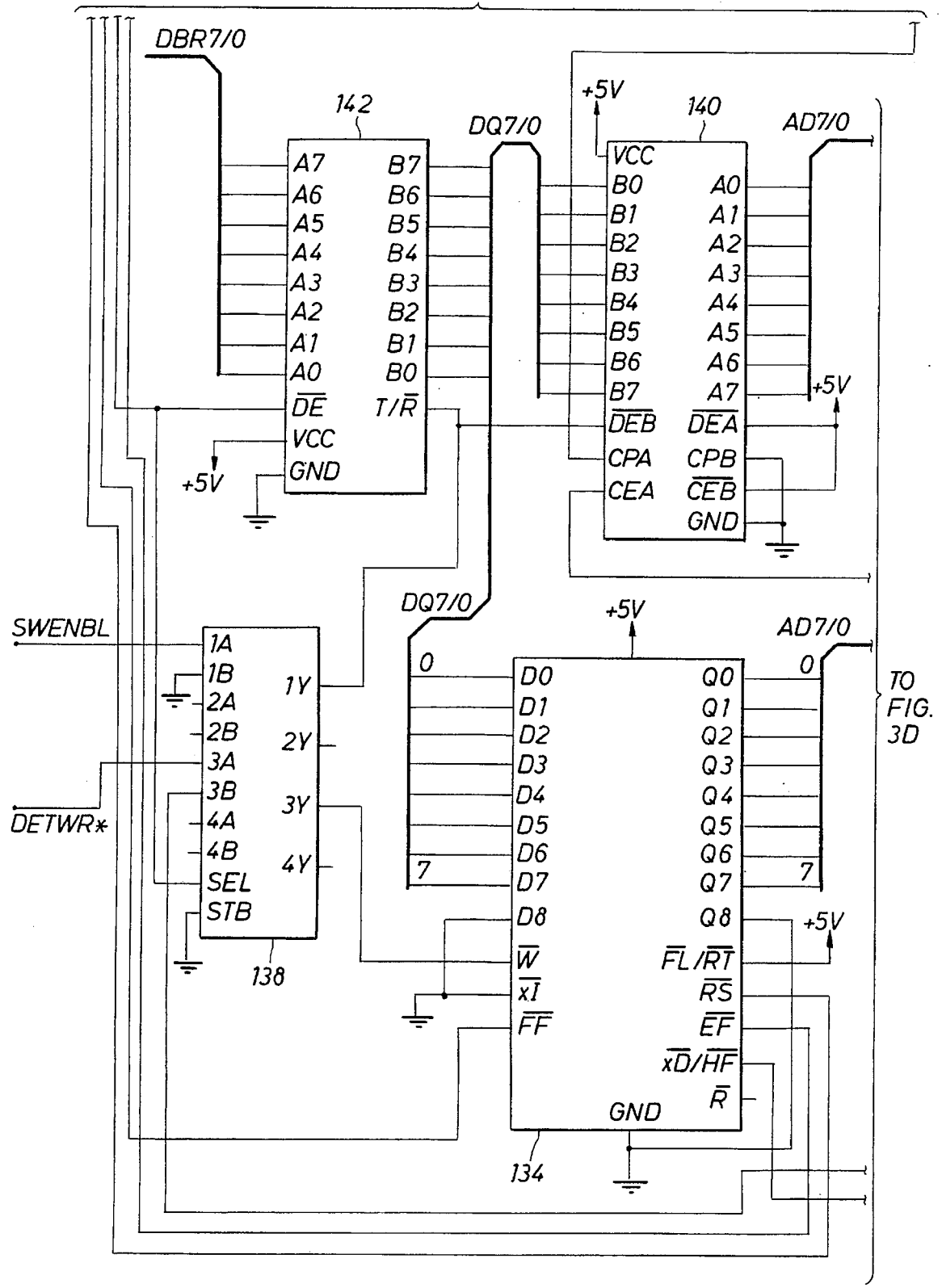
FIG. 3 is a schematic illustration of the controller circuitry according to the invention.
Figure 3C:
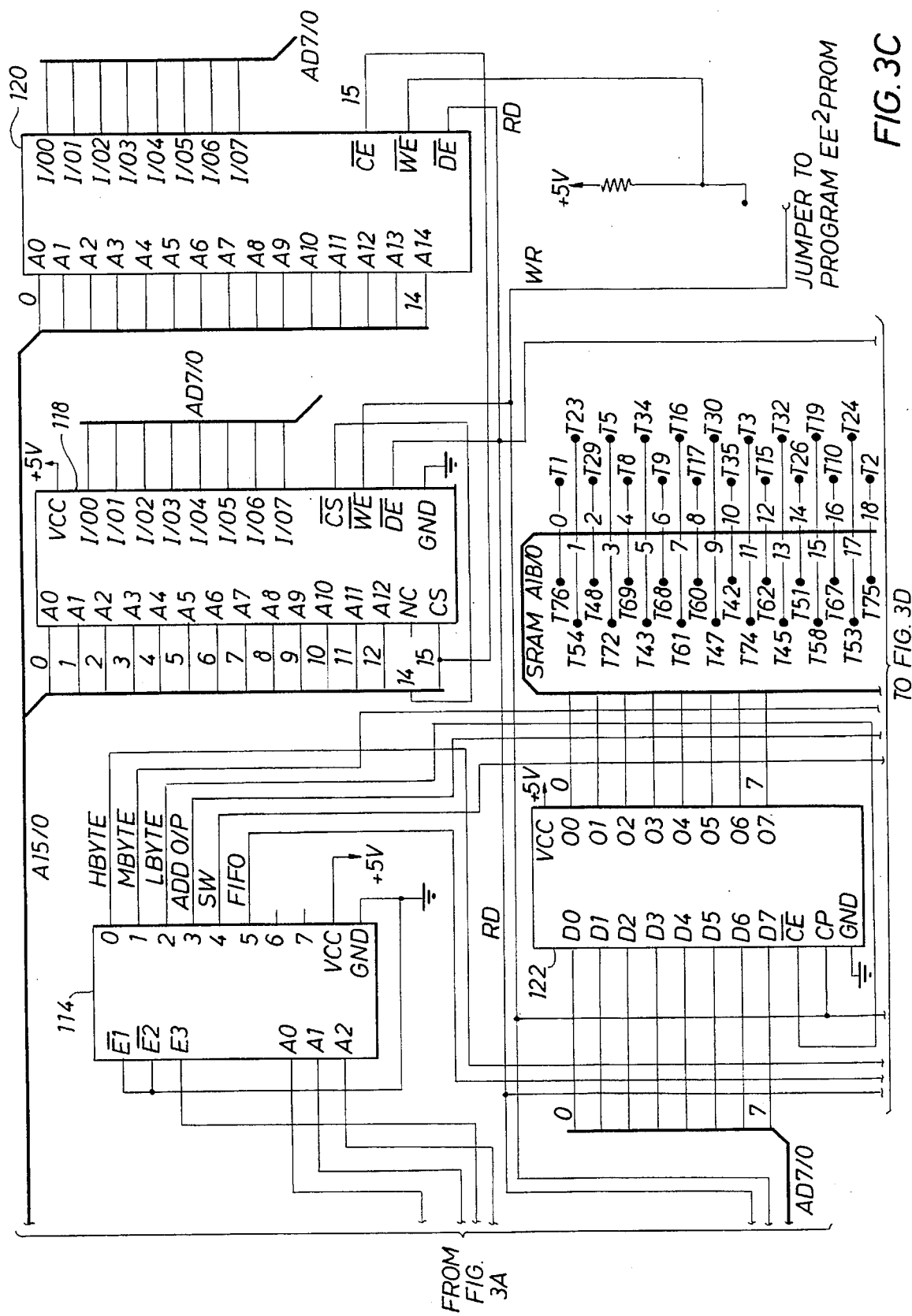
Figure 3D:
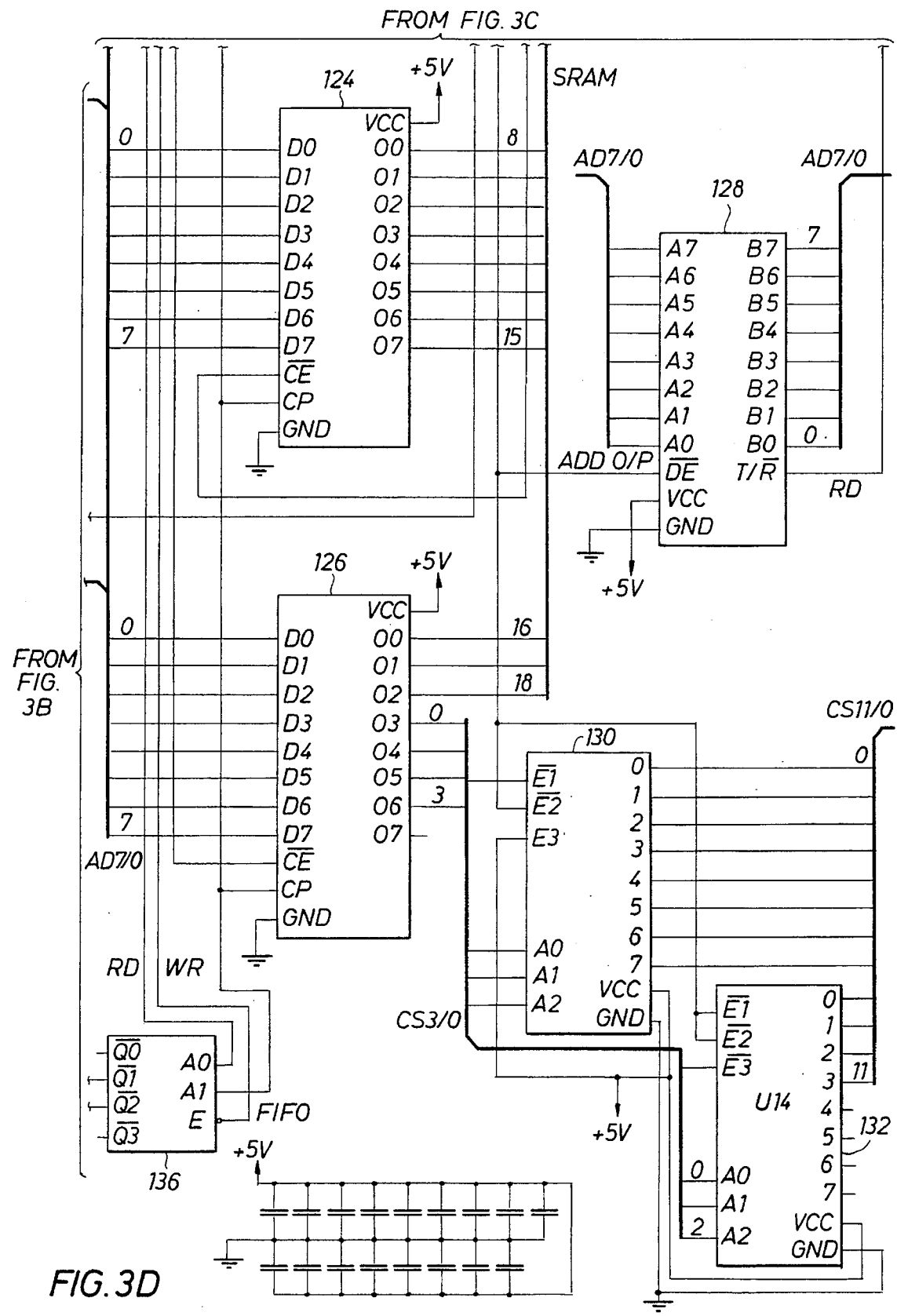

Turning to FIG. 3, illustrated is a schematic diagram of the controller 22. The heart of the controller 22 is a microprocessor 100, which is preferably an 80C32 embedded controller by Intel Corporation. A number of standard components provide appropriate clock and power signals to the microprocessor 100, such as a crystal 102, capacitors 104, 106, and 108, and a resistor 110. Power is provided by the 5 volt supply and the chip is grounded. The 80C32 is a well known embedded controller, and its implementation is well known to those of ordinary skill in the embedded systems arts. A wide variety of other microprocessors could instead be used without in any way detracting from the invention.

The microcontroller 100 provides an interrupt signal INT0 to the spectral detector 18 at 400 Hz. INT0 allows the spectral detector 18 to operate properly. The microcontroller 100 also includes a synchronization input SYNCEN, which is provided by the spectral detector 18 for synchronization purposes. A pair of RS-232 lines are also provided through a port of the microcontroller 100, allowing half duplex RS-232 communications with external devices.

The microcontroller 100 has sixteen address lines and eight data lines. The high order address lines A15/8 correspond to the microcontroller's bidirectional P2.7/2.0 I/O lines. The low order address lines are multiplexed with the data lines, so those address/data lines AD7/0 correspond to the P0.7/0.0 I/O lines. The AD7/0 lines are provided to a transparent latch 112, which is latched by the address latch enable signal ALE from the microcontroller 100. The transparent latch 112 then provides the non-multiplexed low order eight address lines A7/0. The A7/0 lines are used to address and drive a variety of devices, including a decoder 114, an AND gate 116, and a scratch pad random access memory (RAM) 118, and a read only memory (ROM) 120.

These lines are also used to address the static random access memory (SRAM) in the system, as is discussed below in conjunction with FIG. 4. The AND gate 116 combines address lines A15 and A14 so that when both are asserted, the enable of the decoder 114 is asserted.

The decoder 114 is used to select a number of other hardware features within the controller 22. Thus, the highest portion of the address space is mapped to these physical features. These physical features include SRAM control, control of the spectral detector 18, and reading of data from the spectral detector 18. SRAM control is provided through three addresses (HBYTE, MBYTE, LBYTE) which, when written to by the microcontroller 100, cause the assertion of a set high order address byte signal HBYTE, a set middle order address byte signal MBYTE, and a set low order address byte signal LBYTE. Once the SRAM address is set using these three signals, data is written to or read from the SRAMs by writing to or reading from an SRAM address port ADD_O/P, which causes assertion of an SRAM addressing signal ADD_O/P. The spectral detector 18 is controlled by writing to an address SW corresponding to a switch signal SW, and spectral data is read from the spectral detector 18 via a first-in first-out buffer by reading from an address FIFO, which causes assertion of a first-in first-out buffer access signal FIFO.

In practice, to access the SRAMs, the address for the SRAMs is latched into three latches 122, 124, and 126 by writing the appropriate data to those latches by writing to the addresses HBYTE, MBYTE, and LBYTE. Then, to write data to the SRAMs at the latched address, 8-bit data is written to the address ADD_O/P, which enables the output of an octal transceiver 128, writing data onto an SRAM data bus D7/0. To read data, a read is directed to the address ADD_O/P, which causes a read signal to be sent to the SRAMs, as is discussed below. The SRAMs then drive data onto the SRAM data bus D7/0, and the octal transceiver 128 drives that data onto AD7/0. The appropriate chip select signals for the SRAMs are generated by two decoders 130 and 132, which select the appropriate SRAM chip based on ADD_O/P being asserted in conjunction with the appropriate high order bits provided by the high order address byte for the SRAMs as driven by the output of the latch 126.

A FIFO 134 is similarly read by reading from the address FIFO. When the FIFO signal goes high, that enables a dual multiplexer 136, which on a read causes the read input R* of the FIFO 134 to go active, or low. The FIFO 134 then provides data to the microprocessor 100 over AD7/0.

A signal from the P1.0 output of the microcontroller 100 selects a FIFO test mode for the FIFO 134 and its related circuitry. When the signal from P1.0 is high, this switches the outputs of a multiplexer 138 to their B inputs. This in turn forces the first output of the multiplexer 138 low, enabling the B output buffers of a transceiver 140 and disabling all output buffers of a transceiver 142. This in effect couples the data bus AD7/0 of the microcontroller 100 to the data inputs of the FIFO 134. Further, the Q1* output of a decoder 136 is provided (by the multiplexer 138) to the write input W* of the FIFO 134. This causes the write output WR* of the microcontroller 100 to be coupled to the write input of the FIFO 134. Thus, when the P1.0 output of the microcontroller 100 is low, data can be written into the FIFO 134 from the microcontroller 100 via the data bus AD7/0. The capability of writing data to the FIFO is used for diagnostic purposes.

When the select input of the multiplexer 138 is instead driven high, the circuitry is in its operating mode. The outputs of the multiplexer 138 are then provided as a switch enable signal SWENBL and a detector writing signal DETWR*, both of which are provided by the spectral detector 18. In this mode, the spectral detector 18 periodically writes data into the FIFO 134 when DETWR* goes low and SWENBL is low. The Q2* output of the decoder 144 is then forced low, so the transceiver then drives the data on the spectral detector 18 bus DBR7/0 into the FIFO 134.

When SWENBL is true, then the data latched into the octal latch 140 (the spectral detector 18 mode data) is written out to the spectral detector 18 over DBR7/0 through the transceiver 142. The octal latch 140 is loaded by writing to the address SW. SWENBL allows the spectral detector 18 to periodically poll for the switch position to determine in which mode to place the stabilization circuitry—latched, stabilizing, or logging/calibration.

Figure 4:
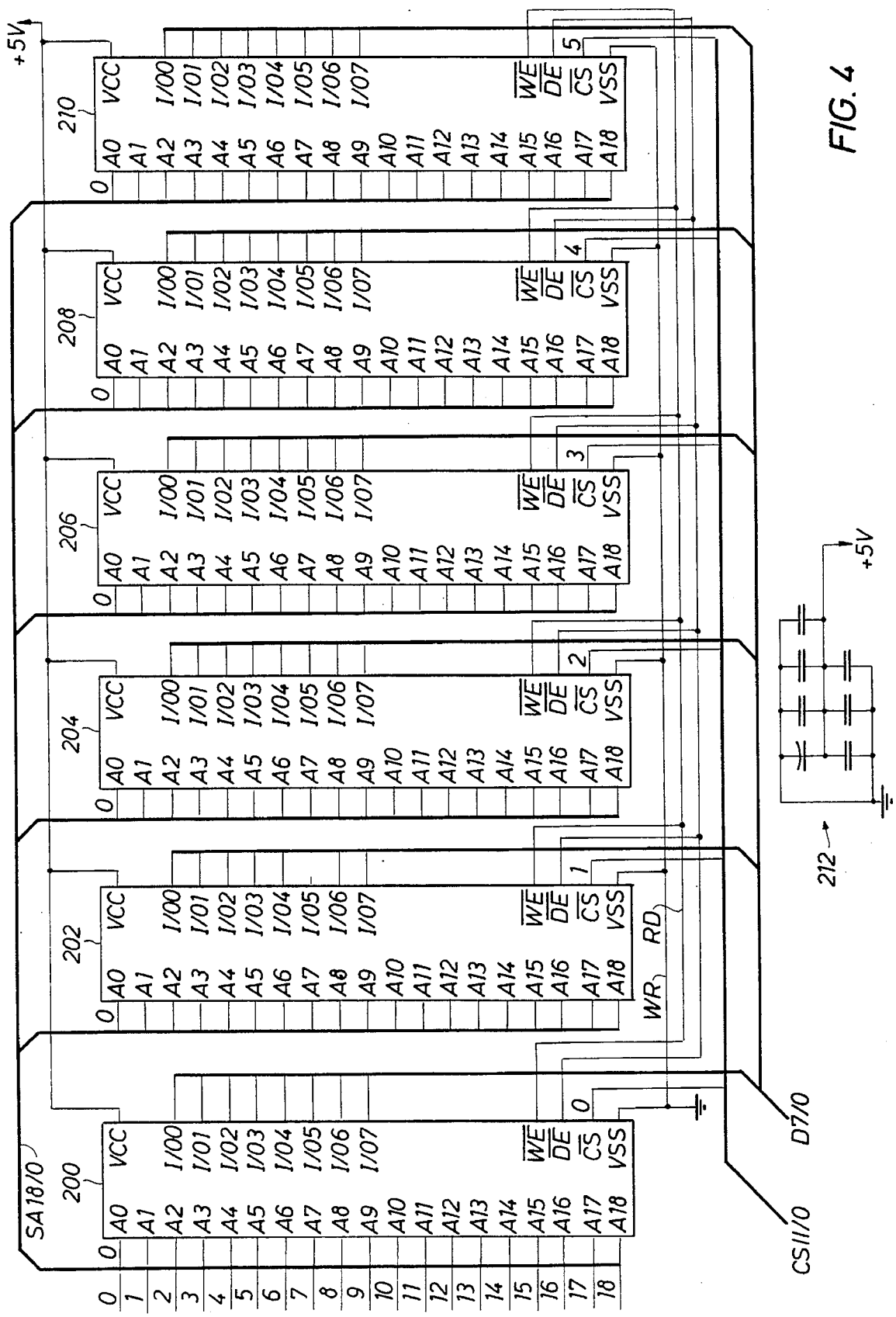
FIG. 4 is a schematic illustration of a bank of static random access memory implemented according to the invention.

Turning to FIG. 4, shown is the SRAM circuitry of the memory 120. Six SRAM chips 200–210 are shown. The SRAM chips 200–210 are preferably 512K×8 static RAMs from White Micro, part no. C50307. This is a specialty part, which is the same as a standard static RAM chip, but allows for operation at up to 200° C.

The SRAM chips 200–210 provide 3 megabytes of memory in the illustrated bank. Preferably, another bank is provided providing a total of 6 megabytes of memory. The SRAMs 200–210 are addressed by SRAM address lines SA18/0. These are provided from the controller 22, illustrated in FIG. 3, and as previously discussed, are latched in by appropriate writes to HBYTE, MBYTE, and LBYTE by the microcontroller 100. Once the address is latched, an appropriate chip select signal CS5/0 is enabled by the latch 126 of FIG. 3, allowing for a read from or write to the desired SRAM 200–210 via the data bus D7/0. The remaining chip selects of CS11/6 are routed to the other bank of SRAM, not shown. Finally, appropriate decoupling capacitors 212 are used.

As discussed above, and as further illustrated by the software appendix, incorporated by reference, it is necessary to compress the data from the spectral detector 18 in order to store it all in the SRAMs 200–210, as well as the second bank of SRAMs not shown. This compression routine relies on the fact that a majority of the 512 spectral data energy channels will have values of zero, indicating no gamma rays of that particular energy. Further, the compression routine also relies on the fact that typically, the values within a particular energy spectrum will at least show counts less than 16, allowing for storage within 4 bits of data rather than 8.

Consecutive channel values that are equal to each other are stored as repeat strings. The first byte contains a code indicating a repeat string follows, along with a count of the number of repeat values. The next byte then contains the value that is repeated.

For a sequence of non-equal values less than 16 (i.e., can be stored in 4 bits) the first byte contains a code indicating that a string of 4-bit elements follows, the second byte contains the count of the number of elements stored in the following bytes, and then the elements themselves follow. The elements are stored two per byte, one value per nibble.

For a string of 8-bit values (that is a value greater than 15 and less than 256) each element requires one full byte to store the data. The first byte is again a code indicating a string of 8-bit elements follows, the next byte is the number of 8-bit elements to follow, and then the actual 8-bit elements follow.

According to the preferred embodiment, if a value is a repeat value and the repeat count is less than or equal to 6, and the data it is adjacent to is a string of non-repeating elements of the same size (i.e., 4-bit elements or 8-bit elements) the repeat values are not be stored as repeat values but will instead be attached to the adjacent string of non-repeating elements, as this is more efficient.

If the value is a string of 4-bit elements and is adjacent to a string of 8-bit elements, and the 4-bit string has less than 6 elements, then the string of 4-bit values are instead treated as 8-bit values and are appended to the 8-bit string.

If a value is a repeat value and its count is less than 12, and it is preceded and followed by strings of non-repeating 4-bit elements, those repeat values will be appended to the 4-bit string as 4-bit elements, rather than treated as a repeat string.

It will be readily apparent how this code is decompressed once the data has been compressed. The decompression routine used in the surface system is further attached in the source code appendix.

Figure 5C:
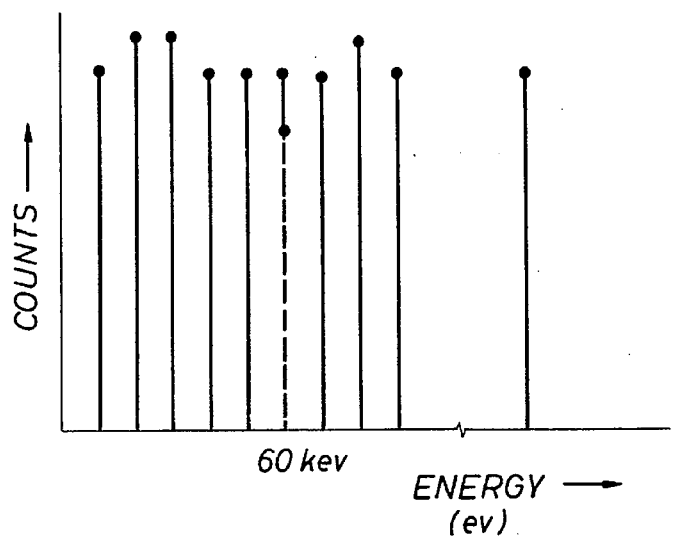

Turning to FIG. 5, a block diagram is shown illustrating how the spectral detector 18 uses feedback to control the voltage to a photomultiplier tube 300. This is illustrated in conjunction with FIGS. 5B and 5C, showing a relative number of counts from the photomultiplier tube 300 within particular energy spectrums. Assume that the photomultiplier tube 300 receives a 60 Kev gamma ray from the americium source. The energy level of that particular pulse is then digitized by a digitizer 302. That digitizer 302 then provides a value to a voltage controller 304 internal to the spectral detector 18, which tracks the peak for the 60 Kev signal illustrated in FIG. 5B. But assume, again referring to FIG. 5B, that this peak drifts to the left as illustrated. The voltage controller 304 must increase the voltage to the photomultiplier tube 300, forcing the peak in FIG. 5B to the right. Therefore, the voltage controller 304 then instructs a PMT voltage supply 306 to increase the voltage to the photomultiplier tube 300.

But turning to FIG. 5C, sometimes the gamma ray count will be so great as to saturate many of the energy spectra, or at least to interfere with the peak found at 60 Kev. In that case, the voltage controller 304 may incorrectly adjust the PMT voltage supply 306, attempting to force a phantom peak to the proper 60 Kev energy spectra. In prior art systems, one had to manually monitor for this condition, and when it occurred take appropriate action from the surface. According to the invention, however, when the total gamma ray count in a predetermined range of channels (for example channels 100 to 489) exceeds a certain value for a 1.6 second time interval, the microcontroller 100 then writes a switch position to the switch address SW that corresponds to the latch mode in the spectral detector 18. That position is then latched into the latch 140, which is then written to the spectral detector 18 when SWENBL is next activated.

This latch mode switch position forces the spectral detector 18 into its latched mode. In this mode, the voltage controller 304 in the spectral detector 18 prevent the PMT voltage supply 306 from changing its voltage to the PMT 300. This is permissible for short periods of time, as the drift of the output of the PMT 300 should not be excessive. Once the gamma ray saturation illustrated in FIG. 5C is reduced, the controller 22 writes a different mode value corresponding to log/calibration mode to the latch 140, allowing the voltage controller 304 within the spectral detector 18 to again enter a log/calibration mode. In this way, wild excursions by the PMT voltage supply 306 are prevented when the gamma rays from the americium source stands to be "washed out" by other gamma rays.

The software for operating the tool, including compressing and decompressing data, switching operating modes, and initiating data storage, is in the source code appendices. Appendix 1 includes the source code for operating the instrument 10, while Appendix 2 is the source code for the decompression routine. That source code is self explanatory, but FIGS. 6A–6D serve to further illustrate the flow of that software.

Turning to FIG. 6A, a flowchart of a main routine 400 is shown. After initialization, the routine 400 proceeds to step 402, where it checks for user input over the RS232 port 26. This would occur when the instrument 10 was at the surface, either before or after a run, and was connected to the surface system.

If input is available at step 402, control proceeds to a case 404, where appropriate action is taken depending on the type of input. If the command is a tool command relating to the spectral detector 18 itself, control proceeds to step 406, where that command is executed. These commands can include commands to change the spectral detector 18 mode, data transmission commands, status checking commands, and commands to initiate a run into the well. The effect of this last command is further discussed below in conjunction with FIG. 6B. After the command is executed, control loops to step 402.

If at step 404 the input is related to testing, control proceeds to step 408, where the appropriate test is performed. This could include, for example, various hardware testing, SRAM testing, and EEPROM testing. After the testing is complete, control then proceeds to step 402.

Other input at step 402 would be spurious, so control proceeds in that case from step 404 to step 410, where an error is indicated and control again loops to step 402.

If no input is available at step 402, control proceeds to step 412, where the routine 400 checks for a full field of spectral data. Preferably, channel data is stored to alternate fields. When one field is full, data is stored to the other field while the data from the first field is compressed to memory. This is further discussed below in conjunction with FIG. 6C.

If a field is full at step 412, control proceeds to step 414, where the data is processed by being compressed to memory. Otherwise from step 412, and in any case from step 414, control proceeds to step 402.

Turning to FIG. 6B, a flowchart of further details of initiating a run is shown. Beginning at step 416, a check is made for entry of a delay time, and at 418, a check is made to ensure the instrument 10 is in an appropriate (log/calibrate or latched) mode. If either condition is false, an error is displayed at step 420, and control returns to the main routine 400 at step 402.

Proceeding to step 422, the delay timer is started, and at step 424, the delay timer is counted down until timeout. This allows for sufficient time to position the tool to begin a data acquisition run. Upon time out, control then proceeds to step 426, where the command mode is set to actually compress and save acquired data. Control then returns to the main routine 400 at step 402.

Figure 6C:
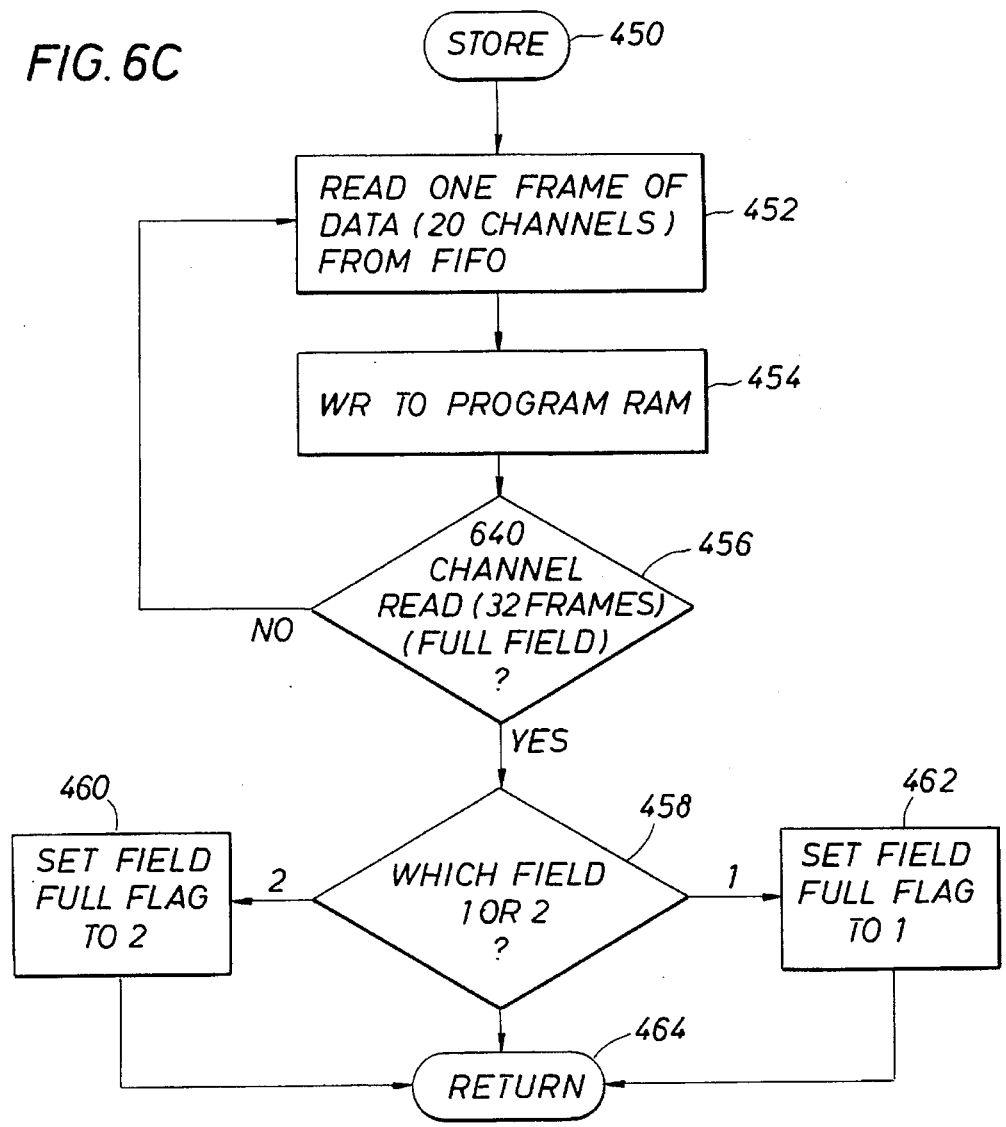

Turning to FIG. 6C, a store routine 450 is shown which reflects the program flow of steps 412 and 414 of FIG. 6A. Control begins at step 452, where data for a full spectrum is read from the FIFO 134 and then written to a field in the RAM 118 at step 454. Control then proceeds to step 456, where it is determined whether a full field of data has been received from the FIFO 134. If not, control loops to step 452; if so, control proceeds to step 458.

At step 458, it is determined to which field the data is in, and a branch is taken reflecting the field. Control proceeds to step 460 if field 2 is full, where a field 2 full flag is set; control proceeds to step 462 if field 1 is full, where a field 1 full flag is set. Control then proceeds to step 464, where a return is executed to the main routine 400.

Figure 6D:
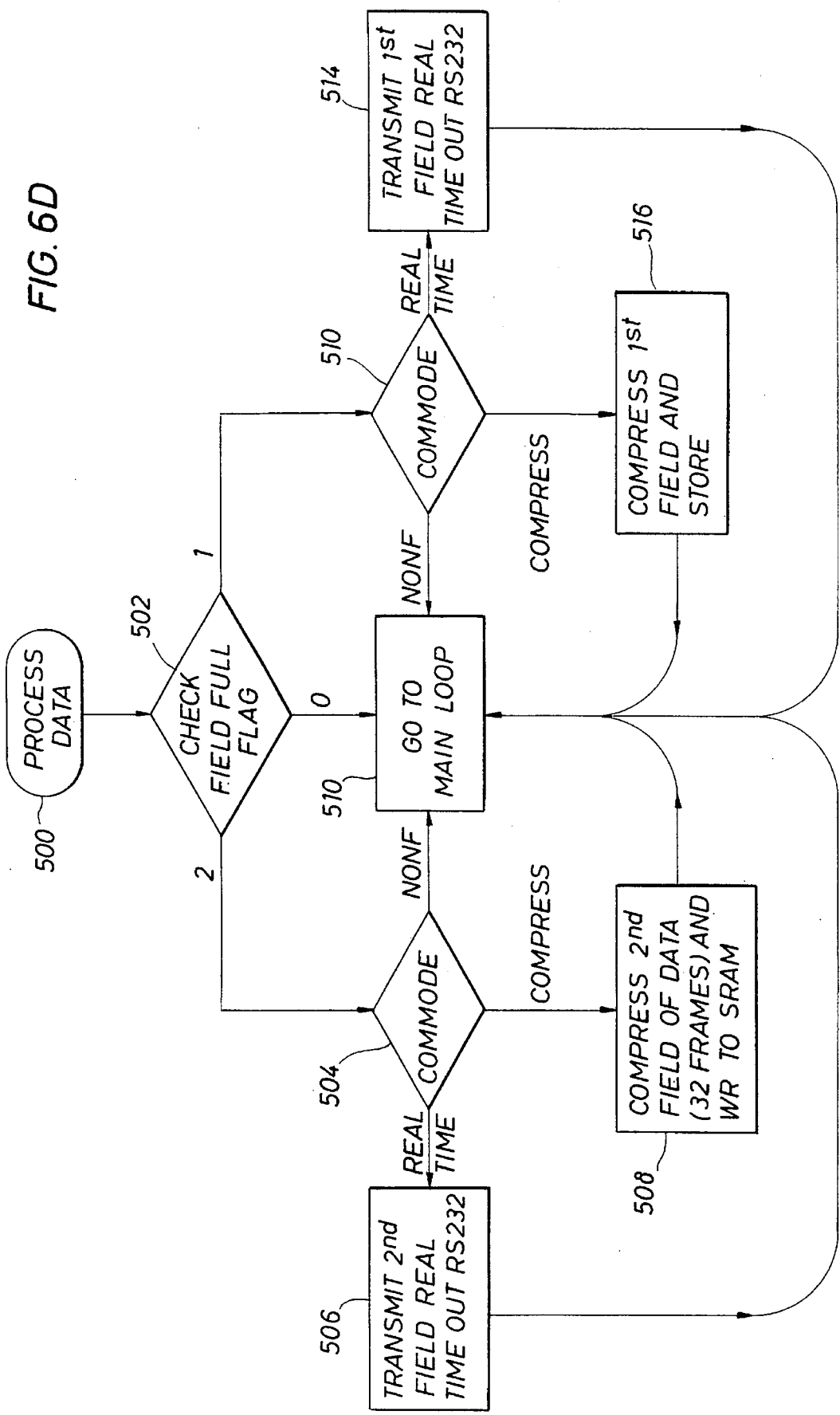

Turning to FIG. 6D, a flowchart illustrates how the data is processed in step 414 of FIG. 6A. A process data routine 500 begins at step 502, where the field full flags are checked. If the second field is full, control proceeds to step 504, where the operating mode is determined (real time or storage). If in real time mode, control proceeds to step 506, where the second field is transmitted over the RS232 port 26. If in storage mode, control instead proceeds to step 508, where the field is compressed and stored in the SRAMs. Otherwise, and from both steps 506 and 508, control proceeds to step 510, where control returns to the main routine 400. Control proceeds in a similar manner for the first field in steps 512–516.

In an actual drilling operation, the instrument 10 would typically be used as follows. First, the instrument 10 would be programmed for the particular run via the RS-232 port by connection with the surface analysis system. During this stage, the spectral detector 18 would be set in an initialization mode and would be calibrated, setting the zero position of an analog-to-digital converter in the spectral detector 18 so that a zero output of the analog-to-digital converter corresponds to a zero energy value of gamma ray. Further, the instrument 10 would be calibrated such that the 60 Kev gamma rays from the americium source correspond to the appropriate output value of the analog to digital converter within the spectral detector 18. In this way, both the zero and the gain would be properly set in the spectral detector 18.

Further, an appropriate delay would be set by the surface analysis system so that the instrument 10 would not begin acquiring data until it was properly in position. This would prevent unneeded data from being stored in the memory 20. Instead, the delay would be set, the instrument 10 would be disconnected from the surface analysis system, and the instrument 10 would be lowered into the well on a slick line. When it was at the appropriate starting depth, the operator would wait until the delay time had passed, at which point the instrument 10 would start actually storing data in the memory 20, and then the instrument 10 would be periodically lowered and raised for the desired number of passes through the zone of interest.

At this point, it is appropriate to note that not only could slick line be used, but also coiled tubing. Further, slick line could be fed through coiled tubing. The coiled tubing could be of a type, for example, disclosed in U.S. Pat. No. 5,121,827 to Legget or U.S. Pat. No. 4,984,634 to Pilla. Using such coiled tubing, appropriate tracer elements could be injected into the hole while the instrument was operating. Similarly, the coiled tubing could be lowered down hole with the slick line inside until the end of the coiled tubing was at the top of the zone of interest. Then, the tubing could be tied off at the top, and the wireline could be lowered further. Thus, a tracer element could be injected at the top of the zone of interest to the coiled tubing, while the instrument 10 is played up and down through the zone of interest on a slick line.

Further, coiled tubing alone could be used to lower the instrument 10. With coiled tubing, openings or spacers could be provided above the instrument 10 so that the instrument 10 and the tubing could be lowered into the well to a certain depth, tracer elements could be injected through the coiled tubing, and then the instrument 10 could be run through the zone of interest. In this technique, no slick line is even needed, as the coiled tubing acts a both a support for the instrument 10 and a path for injecting tracers. A wide variety of techniques for using the slick line in conjunction with the instrument 10 will be appreciated by one of ordinary skill in the art.

Although the use of the instrument 10 has been described in terms of slick line usage, if only wireline is available, the instrument 10 could of course be run on that wireline. It would not need to be coupled to a surface system, however, but could instead use the wireline simply as another form of cabling for lowering the instrument 10.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A well logging instrument for gamma ray spectroscopy, comprising:

a gamma ray spectral detector that provides digital gamma ray spectral data for a plurality of energy spectra;

a controller coupled to the gamma ray spectral detector and receiving the digital gamma ray spectral data, the controller compressing the digital gamma ray spectral data to provide compressed digital gamma ray spectral data; and a memory system coupled to the controller, the memory system receiving and storing the compressed digital gamma ray spectral data.

2. The logging instrument of claim 1, wherein the gamma ray spectral detector includes a log/calibration mode in which a voltage to a photomultiplier tube is dynamically adjusted and a latched mode in which the voltage to the photomultiplier tube is latched, and wherein the controller includes an output for activating the latched mode in the gamma ray spectral detector in response to the digital gamma ray spectral data exceeding a predetermined threshold.

3. The logging instrument of claim 2, wherein the digital gamma ray spectral data includes data corresponding to 60 Kev gamma rays from an americium gamma ray source, and wherein the predetermined threshold corresponds to the 60 Kev gamma rays from the americium gamma ray source being masked by other gamma ray sources.

4. A well logging instrument for gamma ray spectroscopy, comprising:

a gamma ray spectral detector that provides digital gamma ray spectral data for a plurality of energy spectra, that includes a log/calibration mode in which the gamma ray spectral detector dynamically adjusts a voltage to a photomultiplier tube, and that includes a latched mode in which the gamma ray spectral detector latches the voltage to the photomultiplier tube; and a controller coupled to the gamma ray spectral detector and receiving the digital gamma ray spectral data, the controller providing an output for activating the latched mode in the gamma ray spectral detector in response to the digital gamma ray spectral data exceeding a predetermined threshold.

5. The logging instrument of claim 4, wherein the digital gamma ray spectral data includes data corresponding to 60 Kev gamma rays from an americium gamma ray source, and wherein the predetermined threshold corresponds to the 60 Kev gamma rays from the americium gamma ray source being masked by other gamma ray sources.

6. A method of logging gamma ray spectral data using a gamma ray spectroscopy instrument that includes a gamma ray spectral detector, a controller, and a memory, the method comprising the steps of:

receiving digital data from the gamma ray spectral detector;

compressing the gamma ray digital data according to a predetermined algorithm; and storing the compressed digital data in the memory.

7. The method of claim 6 further comprising the steps of:

after the storing step, retrieving the compressed digital data, decompressing the data, and providing the data to an analysis system.

8. The method of claim 6 further comprising the steps of:

before the step of storing the data, delaying a predetermined period of time corresponding to the amount of time necessary to place the instrument into an appropriate position before the storing step.

9. The method of claim 6 in which the digital data includes a plurality of energy spectra elements, and wherein the compressing step further comprises the steps of:

if a next sequence of digital data includes a sequence of identical values, storing as the compressed data a code indicating a repeat sequence, a count of the identical value, and a single instance of the identical values;

if a next sequence of digital data includes a sequence of non-repeating values and the values are less than 16, storing as the compressed data a code indicating a sequence of 4-bit non-repeating values, a count of non-repeating 4-bit values, and a sequence of non-repeating values as a series of 4-bit values, two to an 8-bit byte; and if a next sequence of digital data includes a sequence of non-repeating values and the values are greater than 15, storing as the compressed data a code count of non-repeating 8-bit values, and a sequence of non-repeating values as a series of 8-bit bytes.

10. A well logging instrument for gamma spectroscopy, comprising:

a battery;

a gamma ray spectral detector that provides digital gamma ray spectral data for at least 250 channels of energy spectra, the gamma ray spectral detector coupled to and powered by the battery;

a controller coupled to the gamma ray spectral detector and receiving the digital gamma ray spectral data, the controller being coupled to and powered by the battery, the controller periodically providing spectral data for all of the energy channels; and a memory system coupled to the controller, the memory system receiving and storing substantially all of the data periodically provided by the controller.

11. A method of logging gamma ray spectral data in a well using a gamma ray spectroscopy instrument that includes a gamma ray spectral detector, a controller, a battery, and a memory, the method comprising the steps of:

providing power from the battery to the gamma ray spectral detector, the controller, and the memory;

lowering the gamma ray spectroscopy instrument into the well;

acquiring data for at least 250 energy channels from the gamma ray spectral detector in the controller; providing from the controller spectral data corresponding to each of the at least 250 energy channels; and storing substantially all of the data periodically provided by the controller from each of the at least 250 energy channels from the gamma ray spectral detector in the memory.

12. The method of claim 11, wherein the step of lowering the gamma ray spectroscopy instrument into the well further comprises the step of:

lowering the gamma ray spectroscopy instrument into the well using a slick line.

13. The method of claim 11, wherein the step of lowering the gamma ray spectroscopy instrument into the well further comprises the step of:

lowering the gamma ray spectroscopy instrument into the well using coiled tubing.

14. The method of claim 11, wherein the step of storing the data further comprises the step of:

compressing the data from the gamma ray spectral detector.

15. The method of claim 11, wherein before the step of storing, executing the step of:

delaying a predetermined period of time sufficient to complete the lowering step.

* * * * *